(12) United States Patent
Borrelli et al.

(10) Patent No.: US 7,817,896 B2
(45) Date of Patent: Oct. 19, 2010

(54) OPTICAL WAVEGUIDES CONTAINING QUANTUM DOT GUIDING LAYERS AND METHODS OF MANUFACTURE

(75) Inventors: Nicholas Francis Borrelli, Elmira, NY (US); Sabyasachi Sen, Davis, CA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/404,466

(22) Filed: Apr. 13, 2006

(65) Prior Publication Data

US 2006/0245710 A1    Nov. 2, 2006

Related U.S. Application Data

(60) Provisional application No. 60/676,690, filed on Apr. 29, 2005.

(51) Int. Cl.
*G02B 6/00* (2006.01)
*G02B 6/10* (2006.01)

(52) U.S. Cl. .................. 385/142; 385/131; 385/144
(58) Field of Classification Search .............. 385/131, 385/142, 144
See application file for complete search history.

(56) References Cited

U.S. PATENT DOCUMENTS

| | | | |
|---|---|---|---|
| 5,881,200 A | 3/1999 | Burt | 385/142 |
| 5,906,670 A | 5/1999 | Dobson et al. | 75/370 |
| 6,571,028 B1 * | 5/2003 | LoCascio et al. | 385/16 |
| 7,054,513 B2 * | 5/2006 | Herz et al. | 385/12 |
| 7,058,269 B2 * | 6/2006 | Caron | 385/123 |

OTHER PUBLICATIONS

Auxier J M Etal: "Quantum dots for fiber laser sources" Proceedings of the SPIE, Fiber Lasers II Technology Systems and Applications vol. 5709 No. 1, 2005 pp. 249-262; XP008065604 Bellingham, VA US ISSN: 0277-786X, pp. 257-2559.

Auxier Jason Etal "Ion-exchanged waveguides in glass doped with PbS quantum dots" Applied Physics Letters, AIP, American Institute of Physics Melville NY US vol. 85, No. 25; Dec. 20, 2004 pp. 6098-6100, XP012063860 ISSN: 0003-6951 p. 6098-6099.

Auxier J M Etal "quantum dot doped waveguides produced by ion exchange" Lasers and Electro-Optics 2004 (Cleo) Conference on San Francisco CA USA May 20-21, 2004 Piscataway NJ USA IEEE, vol. 1 May 17, 2004 p. 487-488 XP010745348 ISBN 1-55752-777-6.

Guglielmi M. Etal "preparation and Characterization of Hgxcd 1-xs and Pbxcd 1-xs Quantumdots and doped thin films" Journal of Sol-Gel Science and Technology, Springer New York, NY US vol. 11, No. 3 Aug. 1998 pp. 229-240 xp000784793 issn: 0928-0707.

Yuhuan Xu Etal "Optical waveguide based on CdS quantum dot-doped sodium borosilicate glass fabricated by the sol-gel technique" Proceedings of the SPIE Sol-Gel Optics IV vol. 3136, 1997 p. 326-336; xp008065605, Bellingham VA, US issn: 0277-786x.

Jayakrishnan C. Etal "Fabrication and packaging of 1*8 power splitter/combiner in Bk-7 glass at 1.31/1.55 {mu}m wavelength" Proceedings of the SPIE Photonics 2000 International conference on fiber Optics and Photonics vol. 4417, 2001, p. 271-273, XP000962800 Bellingham VA US ISSN: 0277-786x p. 271, paragraph fabrication.

Jackel J. L. Etal "Reverse Exchange Method for Burying Proton Exchanged Waveguides" Electronics Letters, IEE Stevenage, GB, vol. 27 No. 15 Jul. 18, 1991 pp. 1360-1361 XP000240786 issn: 0013-5194.

* cited by examiner

*Primary Examiner*—Uyen-Chau N Le
*Assistant Examiner*—John M Bedtelyon
(74) *Attorney, Agent, or Firm*—Ronald J. Paglierani; Gregory V. Bean

(57) ABSTRACT

Planar waveguides having quantum dots and methods of manufacture of the planar waveguide are described.

7 Claims, 6 Drawing Sheets

Mode Profile of a Planar Waveguide

Enhancement and Guiding of Pbs Quantum Dot Fluorescence from Planar Waveguides

------- excitation laser spectrum
——— frontface emission through DWM
——— backface output

US 7,817,896 B2

OPTICAL WAVEGUIDES CONTAINING QUANTUM DOT GUIDING LAYERS AND METHODS OF MANUFACTURE

This application claims the benefit of U.S. Provisional Application No. 60/676,690, filed Apr. 29, 2005, entitled "OPTICAL WAVEGUIDES CONTAINING QUANTUM DOT GUIDING LAYERS AND METHODS OF MANUFACTURE."

BACKGROUND

Technical Field

The present invention relates generally to planar waveguides and particularly to planar waveguides with quantum dots.

Quantum dots are often defined as small particles having no dimension greater than the de Broglie wavelength of electrons or holes of the material. As a result of quantum confinement effects, electronic properties of quantum dots can differ from corresponding bulk values. These quantum confinement effects arise from confinement of electrons and holes along the three dimensions. For instance, quantum confinement effects can lead to an increase in the energy gap as the size of the quantum dots is decreased. Consequently, as the size of the quantum dots is decreased, light emitted by the quantum dots is shifted towards higher energies or shorter wavelengths. By controlling the size of the quantum dots as well as the material forming the quantum dots, properties of the quantum dots can be tuned for a specific application.

The potential for amplification of signals over distance using quantum dot doped glass materials is promising. To this end, like erbium semiconductor optical amplifiers, the quantum dots may provide gain via signal amplification. Alternatively, lasing can be achieved. Beneficially, quantum dot waveguide amplifiers and lasers are simpler and cheaper than GaAs-derived semiconductor structures.

Quantum dot containing glass materials are known. For example, U.S. Pat. No. 5,449,645, to Borrelli, et al., and assigned to the present assignee, discloses glass materials including lead sulfide (PbS) quantum dots. Such glass materials are fabricated from batches containing precursors of lead and sulfur along with glass forming oxides. The glass is then subjected to a two-stage heat treatment to produce a nanocrystalline PbS phase within the glass. The crystalline PbS particles (often referred to as crystallites) produced within the glass satisfy the 'quantum dot' dimensional criteria referenced previously. Thereby quantum confinement effects are achieved. The reference discloses the formation of lead selenium (PbSe) quantum dots.

One particular benefit of PbS and PbSe quantum dots is the substantially controllable position of the energy gap to between approximately 1.0 µm to approximately the bulk material gap of 2.5 µm. As the typical communications wavelength is approximately 1.5 µm, these structures pose a viable alternative for in-line amplification (e.g., pumps), or lasing applications, or both. Furthermore, PbS quantum dots have the potential for use in a variety of applications in photonics and other optical applications given their relatively strong optical non-linearity, their temperature dependent absorption and their relatively strong photoluminescence.

While quantum dot structures have many useful applications, guiding of light is essential to many such applications. Notably, the optical mode confinement provided by waveguide structures is useful to effect substantially homogeneous excitation of the quantum dots and to do so over long distances as is required in many telecommunications applications.

As such, what is needed are waveguides having quantum dots in the guiding or active layer methods of fabricating waveguide structures.

SUMMARY

In accordance with an example embodiment, a method of fabricating a planar waveguide containing quantum dots includes providing a glass material; and selectively introducing a first type of ions to the glass material, wherein the first type of ions are exchanged with a second type of ions present in the glass to increase the index of refraction in selected regions of the glass material.

In accordance with another example embodiment, a planar waveguide includes a cladding layer having a first type of component and quantum dots. The waveguide also includes an active layer having the quantum dots and a second type of component which at least partially replaces the first component.

BRIEF DESCRIPTION OF THE DRAWINGS

The invention is best understood from the following detailed description when read with the accompanying drawing figures. It is emphasized that various features are not necessarily drawn to scale. In fact, the dimensions may be arbitrarily increased or decreased for clarity of discussion.

DETAILED DESCRIPTION

In the following detailed description, example embodiments disclosing specific details are set forth in order to provide an understanding of the present invention. The example embodiments are set forth for purposes of explanation and not limitation. Those of ordinary skill in the art will understand that various changes in form and details may be made to the example embodiments without departing from the scope of the appended claims. Moreover, descriptions of well-known materials and methods may be omitted so as to not obscure the description of the example embodiments. Nonetheless, such materials and methods that are within the purview of those of ordinary skill in the art may be used in accordance with the example embodiments.

Figure 1:
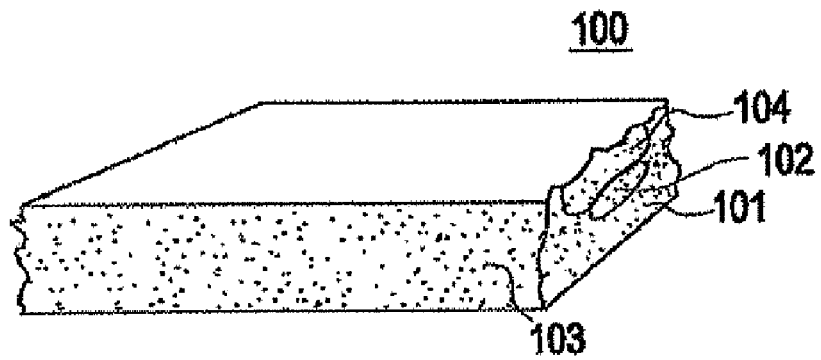
FIG. 1 is a perspective view of a planar waveguide in accordance with an example embodiment.

FIG. 1 is a perspective view of a portion of a planar waveguide 100 in accordance with an example embodiment. The planar waveguide 100 includes a first cladding layer 101 and a guiding or active layer 102 each of which includes a plurality of quantum dots 103. Disposed over the active layer 102 is a second cladding layer 104, also including a plurality of quantum dots 103. The first and second cladding layers 101 and 104, respectively, have indices of refraction that are less than an index of refractive of the active layer 102.

The waveguides of the example embodiments shown in FIG. 1 illustratively comprise NaCa-boroaluminosilicate glass of compositions in the following ranges (in mole %): approximately 56% to approximately 60% $SiO_2$; approximately 4% to approximately 6% $Al_2O_3$; approximately 16% to approximately 18% $B_2O_3$; approximately 10% to approximately 15% $Na_2O$; approximately 9% to approximately 10% CaO; and 0.5% PbS.

As will be described in further detail herein, in specific embodiments the active layers 102 have undergone an ion-exchange reaction of potassium ions ($K^+$) or silver ions ($Ag^+$) for sodium ions ($Na^+$) to suitably raise the index of refraction to ensure light confinement within the active or guiding layers 102, 202. Alternatively, the ion exchange may be rubidium ions ($Rb^+$) or Cesium ($Cs^+$) for the sodium ions of the glass.

While the description of the example embodiments is directed to the glass composition, including PbS quantum dots, and ion-exchange reactants disclosed above, it is emphasized that these materials are illustrative, and that other materials and quantum dot structures may be used in specific embodiments. For example, alternate quantum dot materials, include, but are not limited to: CuCl, $CuBr_2$, $Cu_2O$, AgCl, CdS, CdSe, CdTe, ZnO, ZnS, $In_2O3$, PbSe or PbTe.

As will be appreciated by those of ordinary skill in the art, the energy bandgap and Bohr radius of the selected quantum dot material are selected for their optical properties and confinement. Clearly, different applications will allow for the selection of different materials. In specific embodiments, the tuning range (wavelength) is approximately 1000 nm to approximately 2500 nm, and the quantum dot material is selected to provide a suitable bandgap for such a wavelength range. By similar analysis, depending on the desired tuning range, the quantum dot material is selected to have a bandgap energy that equates to the desired wavelength range of the tuning range. Finally, specific details of these alternate quantum materials may be found in "Semiconductor Nanocrystals" by Alexander L. Efros, et al., Kluwer Academic Press/Plenum Publishers, (2004) page 18. This reference is specifically incorporated herein by reference.

The PbS quantum dots 103 have radii on the order of approximately 2.0 nm to approximately 5.0 nm, which is smaller than the bulk exciton Bohr radius of 18 nm. Thus the quantum dots are well within the strong three-dimensional confinement limit. Moreover, the quantum dots have a bandgap of approximately 0.4 eV at 300 K, allowing the tuning of the ground excited state transition across the near-infrared spectrum. Of course, this includes the telecommunications transmission band of approximately 1300 nm to approximately 1550 nm.

In addition to these desirable attributes, the quantum dots 103 provide non-linear optical properties, which may be useful for mode-locking in certain applications (e.g., lasers) and improved gain.

Figure 2:
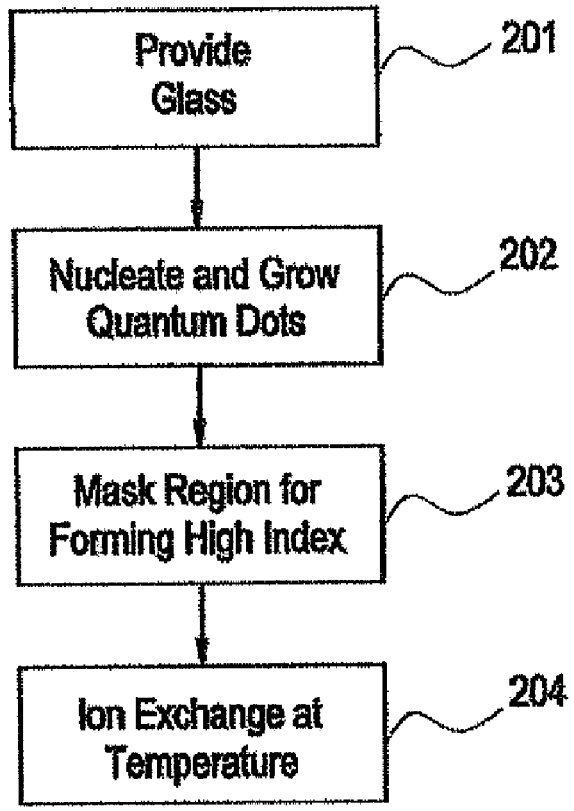
FIG. 2 is a flow-chart of a method of fabricating optical waveguides in accordance with an example embodiment.

FIG. 2 is a flow-chart of a method of fabricating waveguides from quantum dot glass materials in accordance with an example embodiment. The method includes providing a glass material at step 201. In a specific embodiment, the glass material is the NaCa-boroaluminosilicate glass material described previously. The glass is melted from batch materials at 1350° C. in a silica crucible, followed by grinding, crushing and re-melting the glass twice to ensure homogeneity of the glass.

At step 202, the nucleation and growth of quantum dots is carried out. In a specific embodiment, the nucleation is illustratively carried out by heating the glass from completed step 201 at approximately 600° C. for approximately 6 hrs. Growth of the quantum dots is effected by heating the glass after nucleation at approximately 675° C. for approximately 1.5 hrs. This growth sequence precipitates PbS quantum dots having a 1 s-1 s absorption at approximately 1550 nm. In another specific embodiment, the heating to precipitate growth of the PbS quantum dots may be carried out at 655° C. for approximately 1 hr. to approximately 2 hrs. This results in an absorption edge of approximately 1200 nm. It is emphasized that the bandgap of the quantum dots may be engineered to provide different absorption edges using similar variation in growth temperature and time. Moreover, it is emphasized that other heat treatments may be used.

At step 203, a masking sequence is carried out in order to form the active layer of the quantum dot waveguide structure of an example embodiment. The illustrative masking sequence is for the formation of a planar waveguide.

Initially the glass surface is cleaned using a suitable solvent, followed by: a deionized water (DI) rinse; a DI ultrasonic cleaning step; and an oxygen plasma cleaning step, all of which are well-known in glass manufacture. In a specific embodiment, the oxygen cleaning is carried out at 150 W and 100 mtorr.

Next, a masking material is deposited on the glass surface by standard evaporation or other suitable deposition technique. The masking material must be able to withstand the molten material (e.g., salt) used in the ion exchange process. In a specific embodiment, silicon is used. Alternatively, titanium could be used as the masking material.

The silicon thickness is on the order of approximately 0.5 μm. Next, hexamethyldisilazane (HMDS) is provided over the surface to improve photoresist adhesion to the glass. After the HMDS deposition, a negative resist coating is applied at a thickness of approximately 0.2 μm. After the photoresist is deposited, the resist is patterned illustratively via optical cross-connect (OXC) guide level masks.

After the resist is patterned, the silicon is patterned by standard techniques. For example, patterning is carried out via 30 sccm of $SF_6$ at 450 W and 50 mtorr. The resist is then removed using a solvent, and a one-minute plasma $O_2$ cleaning at 150 W, 30 mtorr. This provides the requisite masking of the glass, with a relatively small opening or window in the silicon mask through which the ion-exchange is effected, in order to achieve a desired alteration of the index of refraction.

The selective index alteration of the quantum dot-containing glass material is effected by an ion-exchange reaction between an ion component of the glass and an ion component introduced through a window in the mask formed in step 203. The thermal diffusion of ions in a concentration gradient is the mechanism for the ion exchange process.

In a specific embodiment, a molten salt of $KNO_3$ provides potassium ions. In another specific embodiment, the molten salt may be $AgNO_3$. In yet another specific embodiment, a molten salt of $RbNO_3$ or $CsNO_3$ may be used. Regardless of the salt chosen, the ion-exchange reaction displaces the sodium ions in the glass with ions, which alter the index of refraction. Ultimately, this exchange is carried out at depth in the glass and produces a change in the index of refraction by locally altering the glass density and mean polarizability, calculated by the known Lorenz-Lorenz formula.

In a specific embodiment, the ion-exchange of potassium for sodium is carried out in a $KNO_3$ bath at approximately 450° C. to approximately 500° C. for approximately 24 hrs. Notably, this treatment does not alter the size distribution of the PbS dots, and thus does not affect their electronic/optical properties.

The resulting index of refraction increase in the regions of ion-exchange may be altered by varying the temperature and time to provide a numerical aperture (NA) of the resulting waveguide on the order of approximately 0.10 to approximately 0.22. As is known, NA is indicative of the change in the index of refraction ($\Delta n$), which in turn depends on the amount of ion exchange (e.g., K) for Na that has occurred. The latter is controlled by the concentration of ion exchange material (e.g., K) in the bath. The greater the amount of ion exchange, the greater the change in the index of refraction.

Naturally, after the ion-exchange sequence is complete, the silicon mask is removed by standard techniques and the waveguide is completed. For example, after cleaning the glass with a salt bath, DI rinse and DI sonification, the silicon is removed with 100 sccm $O_2$ at 300 W, 400 mtorr.

Figure 3:
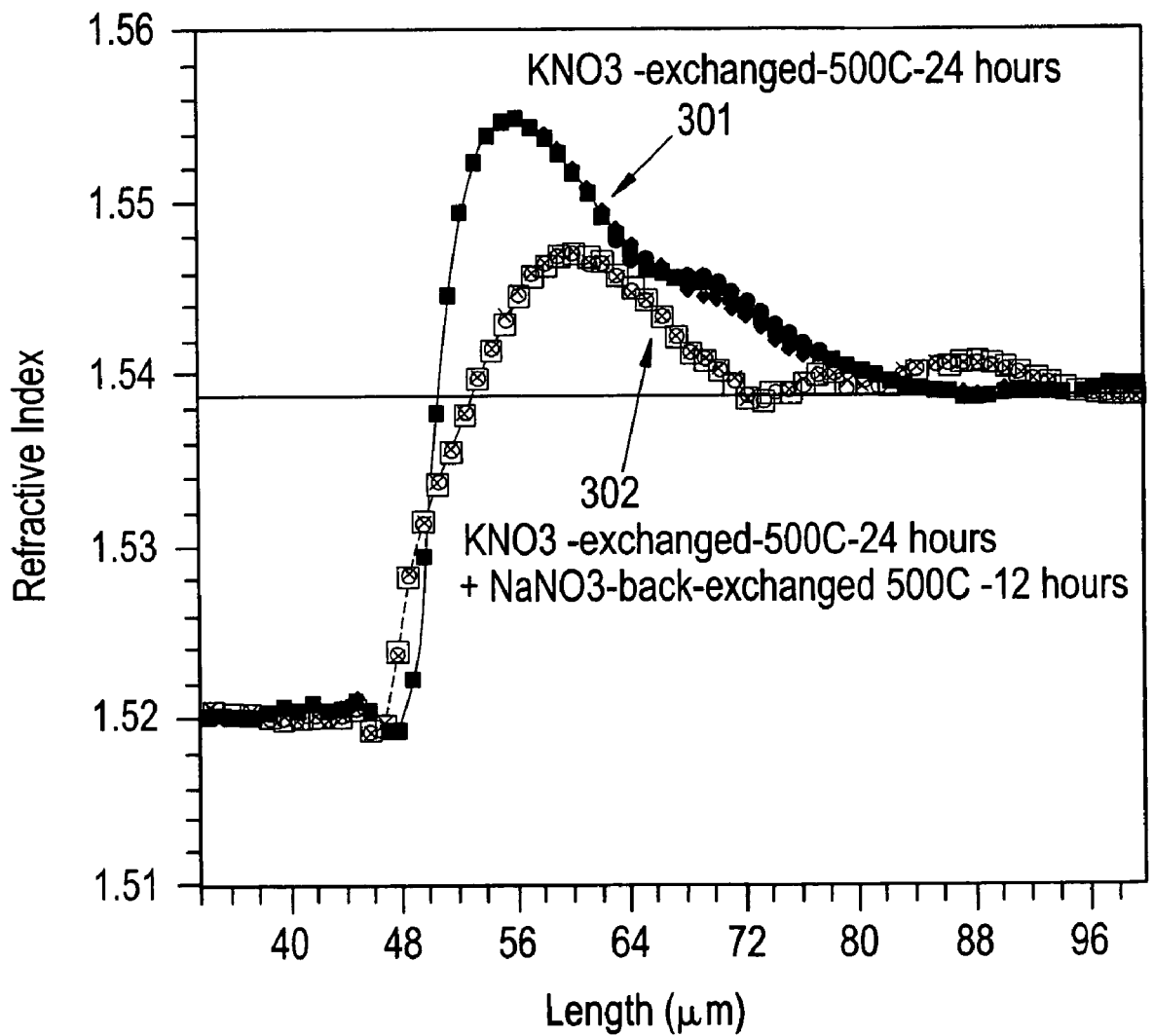
FIG. 3 is a graph of index of refraction versus distance in a waveguide in accordance with an example embodiment.

FIG. 3 is a graph showing the index profile of a planar surface or "channel" waveguide fabricated using the potassium ion-exchange sequence described immediately above. Curve 301 shows the profile of the index of refraction with distance for an exchange of sodium for potassium via $KNO_3$ at 500° C. for 24 hrs. At approximately 48 μm, corresponding to a point near the surface of the ion-exchanged glass, the index of refraction increases to approximately 1.556, and then decreases to approximately 1.54 at approximately 80 μm. Thus, an index of refraction differential between the active layer (e.g., 102) and the cladding layers (101, 104) of approximately 0.02 is realized. This is sufficient for light confinement.

In the present example embodiment, the depths of the ion exchange can be fabricated to depths of approximately 5 μm to approximately 50 μm by varying the time and temperature of the exchange process. Thus, the thickness of the cladding layers 101, 104 and the depth of the active layer 102 are controlled by controlling the ion-exchange process. Notably, the depth of the ion exchange is proportional to the square root of the time.

Curve 302 shows the index profile for a planar waveguide having undergone K—Na ion exchange at 500° C. for 24 hours followed by a back-exchange of sodium via $NaNO_3$ at 500° C. for 14 hours. The back-exchange of sodium for potassium in another exchange usefully buries the higher index active layers of the waveguide to minimize scattering losses. As such, the index differential created at approximately 48 nm tapers to approximately 1.54 nm at approximately 72 nm.

Waveguide burying is effected to assist in keeping the light away from the surface, where dust, scratches, finger prints, and the like all are sources of loss. In addition, waveguide burying is effected to provide circularization of the index pattern so that the profile of the eigenmode(s) supported by the waveguide (also referred to as the modal profile) will be more readily matched to input and output fibers.

Figure 4:
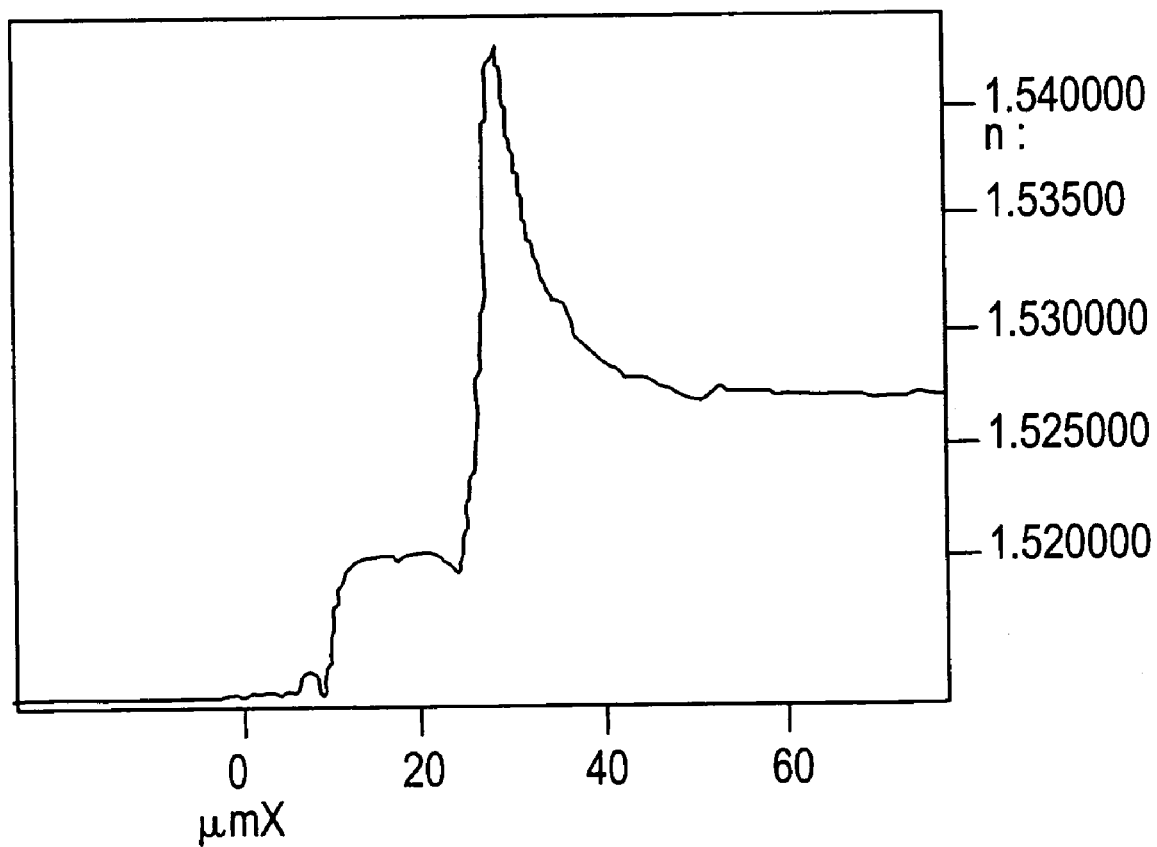
FIG. 4 is a graph of index of refraction versus distance in a waveguide in accordance with an example embodiment.

FIG. 4 shows the index of refraction profile resulting from a silver-sodium ion exchange. This process occurs in much the same way as the fabrication using potassium of steps 301-304 of FIG. 3. Notably, the glass sample is introduced into a bath of 1% $AgNO_3$ and 99% $NaNO_3$ for approximately one hour. The resulting waveguide has an NA of approximately 0.22.

Figure 5:
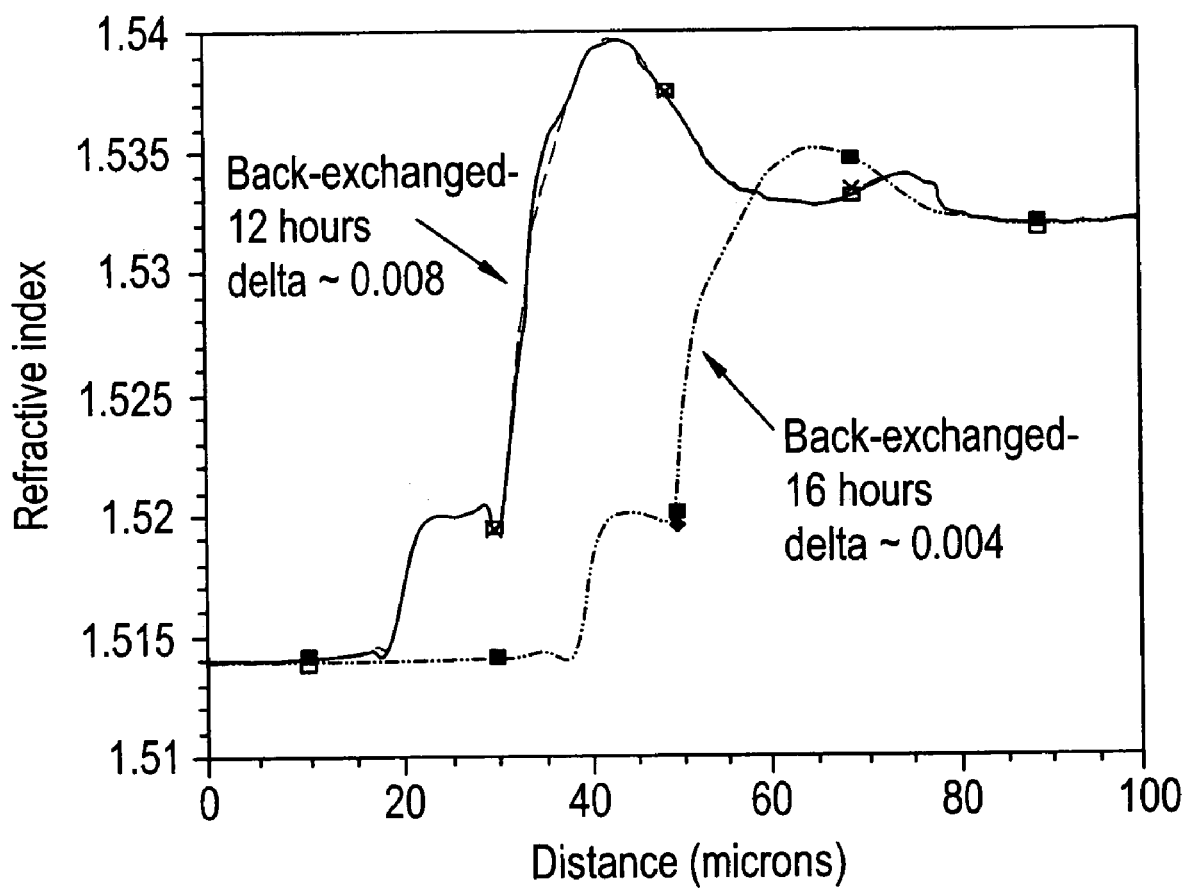
FIG. 5 is a graph of index of refraction versus distance in a waveguide in accordance with an example embodiment.

FIG. 5 shows an experimental example of the burying process. As noted, one graph shows the index versus depth when the back/reverse exchange process occurs over a twelve hour period. Another graph shows the index of refraction when the reverse/back exchange process occurs over sixteen hours. Qualitatively, FIG. 5 shows how deep into the glass material the waveguide is formed as a function of time of the reverse exchange. Notably, the waveguide subject to the back exchange process for 16 hours is more deeply buried, but has a lesser index differential (approximately 0.004) between the active and cladding layers and thus has a lesser NA than the waveguide of curve 501.

Figure 6:
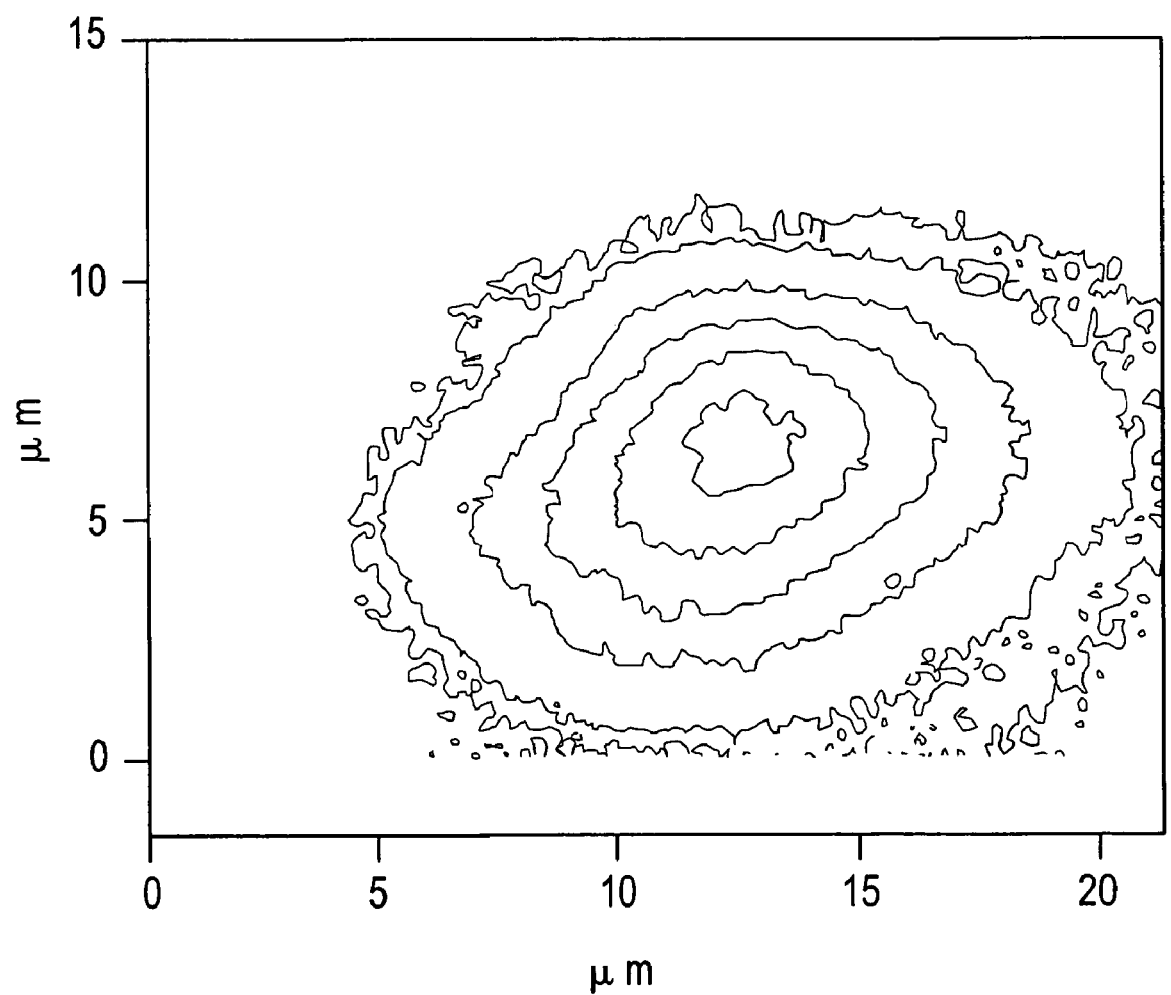
FIG. 6 is a contour profile of an optical mode traversing a waveguide in accordance with an example embodiment.

FIG. 6 shows the waveguiding of a 1550 nm laser diode and the resulting mode profile of a guide mode. Notably, the mode is substantially elliptical, with contours of maximum intensity from 0.1 of the maximum intensity to 0.9 of the maximum intensity. Each contour line is at a differential (delta) of 0.1 of the maximum intensity from its neighbors. As can be appreciated from a review of FIG. 6, the modes of the waveguide are substantially circularly symmetric. This symmetry will benefit the coupling efficiency to the connecting devices such as optical fibers.

Figure 7:
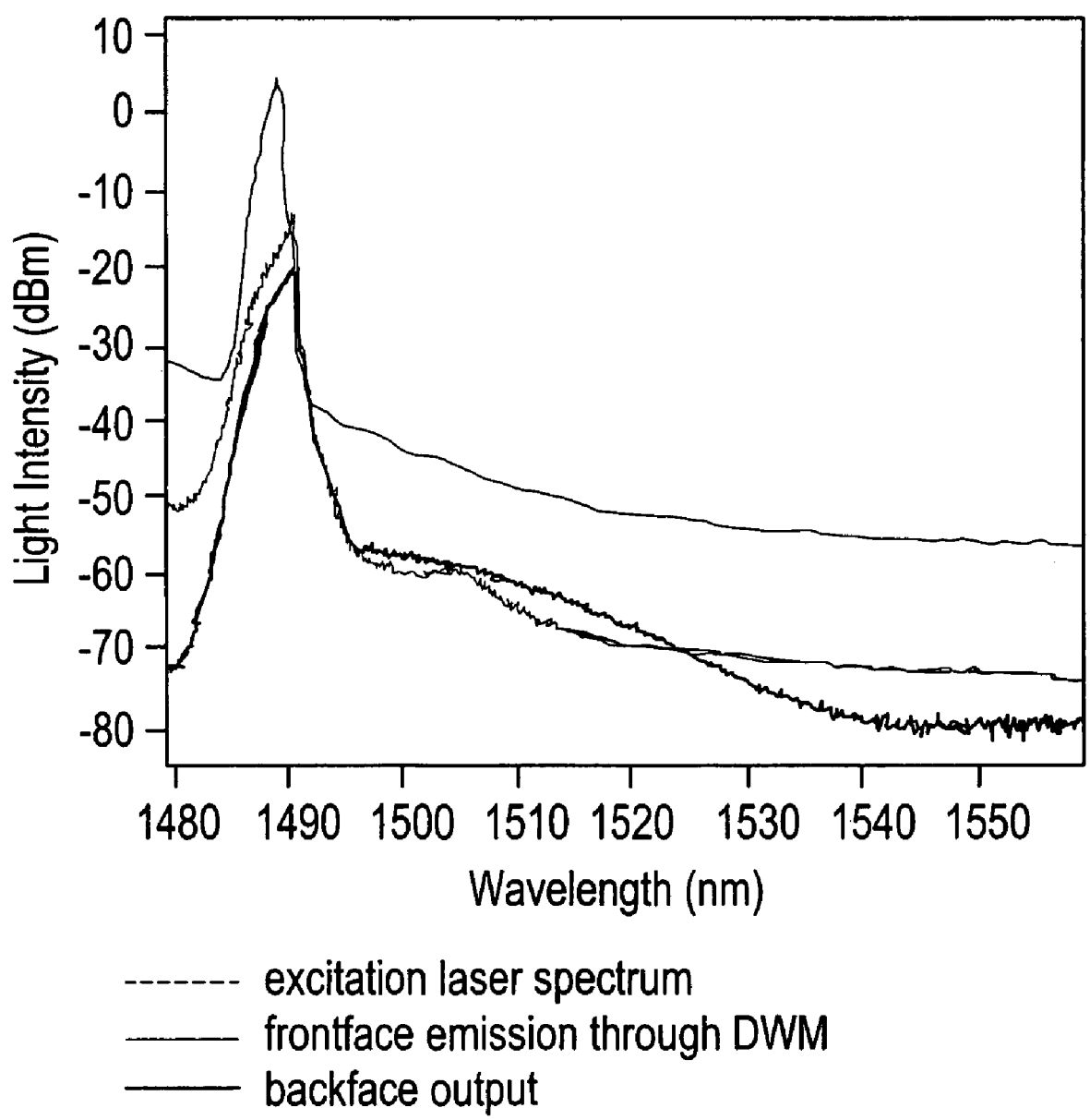
FIG. 7 is a graphical representation of light intensity versus wavelength of a waveguide in accordance with an example embodiment.

As noted, one useful application of the quantum dot waveguides of the example embodiments is amplification and lasing. FIG. 7 is a graph of light intensity (I) versus wavelength for a planar waveguide of an example embodiment. The planar waveguide provides enhancement and spontaneous emission from the PbS dots due to light confinement provided by the waveguide. In the present embodiment, light from a 1490 nm laser at 50 mW is introduced into the active layer of the waveguide and results in spontaneous emission as shown.

In view of this disclosure it is noted that the various methods, devices and parameters are included by way of example only and not in any limiting sense. In view of this disclosure, those skilled in the art can implement the various example devices and methods in determining their own techniques and needed equipment to effect these techniques, while remaining within the scope of the appended claims.

The invention claimed is:

1. A planar waveguide comprising an NaCa-boroaluminosilicate glass material having a composition of: approximately 56 mole % to approximately 60 mole % $SiO_2$; approximately 4 mole % to approximately 6 mole % $Al_2O_3$; approximately 16% to approximately 18% $B_2O_3$ mole %; approximately 10 mole % to approximately 15 mole % $Na_2O$; approximately 9 mole % to approximately 10 mole % CaO; and 0.5 mole % PbS, the waveguide further comprising:
a cladding layer having a first ionic component and quantum dots; and
an active layer having quantum dots and a second ionic component, the second ionic component being present within the active layer at a greater concentration than in the cladding layer.

2. A planar waveguide as recited in claim 1, wherein the first ionic component includes sodium.

3. A planar waveguide as recited in claim 2, wherein the second ionic component is selected from the group consisting of: silver, potassium, rubidium and cesium.

4. A planar waveguide as recited in claim 1, wherein the quantum dots are PbS quantum dots.

5. A planar waveguide as recited in claim 1, wherein the quantum dots are in the form of a precipitate within a glass, the quantum dots comprising one or more selected from the group consisting of: CuCl quantum dots, $CuBr_2$ quantum dots, $Cu_2O$ quantum dots, AgCl quantum dots, CdS quantum dots, CdSe quantum dots, CdTe quantum dots, ZnO quantum dots, ZnS quantum dots, $In_2O3$ quantum dots, PbSe quantum dots and PbTe quantum dots.

6. A planar waveguide as recited in claim 1, wherein the quantum dots provide a wavelength tuning range of approximately 1000 nm to approximately 2500 nm.

7. A planar waveguide as recited in claim 1, wherein the quantum dots provide a wavelength tuning range of approximately 1300 nm to approximately 1550 nm.

* * * * *